United States Patent [19]

Kraus

[11] 4,325,592
[45] Apr. 20, 1982

[54] AXIAL THRUST BEARING ASSEMBLY

[75] Inventor: Charles E. Kraus, Austin, Tex.

[73] Assignee: Excelermatic Inc., Austin, Tex.

[21] Appl. No.: 189,066

[22] Filed: Jan. 19, 1981

[51] Int. Cl.³ .................. F16C 19/10; F16C 19/52; F16C 27/08

[52] U.S. Cl. .................. 308/219; 308/227; 308/233

[58] Field of Search .............. 308/219, 220, 221, 222, 308/227, 229, 230, 231, 232, 233, 234

[56] References Cited

U.S. PATENT DOCUMENTS

| | | | |
|---|---|---|---|
| 933,974 | 9/1909 | Gohlke | 308/230 |
| 1,000,612 | 8/1911 | Casse | 308/234 |
| 1,137,263 | 4/1915 | Gohlke | 308/230 |
| 1,232,800 | 7/1917 | Hess | 308/227 |
| 2,440,444 | 4/1948 | Huber | 308/230 |
| 2,919,963 | 1/1960 | Mims | 308/219 |
| 2,986,436 | 5/1961 | Shiotsu | 308/227 |
| 3,281,192 | 10/1966 | Daubenfeld | 308/219 |
| 3,409,338 | 11/1968 | Root et al. | 308/231 |
| 3,556,618 | 1/1971 | Toth | 308/231 |

FOREIGN PATENT DOCUMENTS

| | | | |
|---|---|---|---|
| 1041307 | 10/1958 | Fed. Rep. of Germany | 308/227 |
| 376740 | 7/1932 | United Kingdom | 308/219 |

*Primary Examiner*—Richard R. Stearns
*Attorney, Agent, or Firm*—Klaus Bach

[57] ABSTRACT

An axial thrust bearing assembly for supporting an axial load on a load support member includes a main antifriction bearing arranged between the load and the load support member and at least one auxiliary antifriction bearing also arranged between the load and the load support member together with spring means which are so selected that a predetermined amount of load is carried by the auxiliary bearing, the remainder of the load being taken up by the main bearing so as to reduce the main bearing load by the amount carried by the auxiliary bearing.

5 Claims, 3 Drawing Figures

AXIAL THRUST BEARING ASSEMBLY

BACKGROUND OF THE INVENTION

1. Field of the Invention

The invention relates to an axial thrust bearing assembly for heavy axial loads relative to the weight and size of the bearing.

2. Description of the Prior Art

In order to take heavy loads, antifriction axial thrust bearings need to be quite large and heavy and not always is the space available to accommodate such bearings. If used for example in connection with the traction rollers of traction roller transmissions such as described in U.S. Pat. No. 168,521 the space limitations are quite stringent.

Hydraulic bearings as they are used for example in connection with the traction roller transmission described in U.S. Pat. No. 3,810,398 are capable of supporting large loads but they require a high pressure hydraulic pump which is considered to be a disadvantage for simple, small transmissions.

As shown in U.S. Ser. No. 168,521 the antifriction bearings are ball-type bearings but even the largest bearings that can be fitted into the space within the rollers represent the main limiting factor in the life of transmissions as disclosed in this patent.

SUMMARY OF THE INVENTION

In order to overcome such life limiting factors but still provide a relatively small bearing structure, there are provided according to the present invention two concentric bearings of which one is engaged between the bearing support and a supported member by springs which transfer a certain amount of the load to said one bearing while the remainder of the load is taken up by the other bearing.

For example, one fourth of full design load is taken up by the one bearing at all times, and this bearing is designed to handle this constant load for a life several times the life of the transmission or device with which it is employed while the other bearing takes up the remainder of the load.

This way the maximum load of the other bearing is reduced by one fourth. With this arrangement, depending on the duty cycle, the system life of the pair of bearings is increased two and one half-fold which is a substantial, very worthwhile gain.

DESCRIPTION OF A PREFERRED EMBODIMENT

Figure 1:
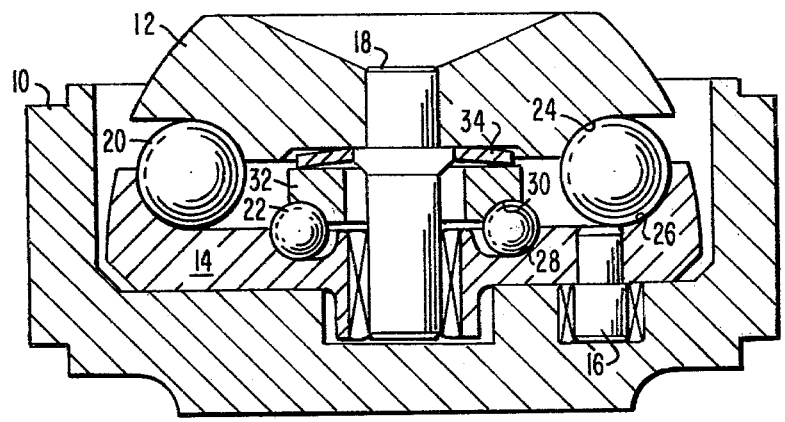
FIGS. 1 and 2 show two different embodiments of the present invention.

FIG. 1 shows a pivotal support structure 10 as it is used in traction roller transmissions of the type described for example in U.S. Pat. No. 3,810,398 for the support of traction roller 12. For this particular application, the traction roller 12 with its bearing support 14 is pivotally mounted by means of a pin 16. The traction roller 12 is supported by a stud 18 within the bearing support 14; however the axial load is taken up by two antifriction bearings 20 and 22. The main bearing 20 is a ball bearing whose races 24, 26 in the given example, are directly formed on the traction roller 12 and the bearing support 14. An auxiliary bearing 22 has one race 28 formed by the bearing support 14 and the other race 30 formed by a bearing ring 32. Axial loading is provided by a Belleville-type spring ring 34 disposed between the bearing ring 32 and the traction roller 12.

The spring ring 34 is so selected that a force about 25% of the full design load is always applied to the auxiliary bearing 22 while the remainder of the load is taken up by the main bearing 20. The main bearing 20 also determines the axial position of the traction roller 12 whenever the load is more than 25% of full load. Below this value all the axial load is taken up by the auxiliary bearing 22.

Figure 2:
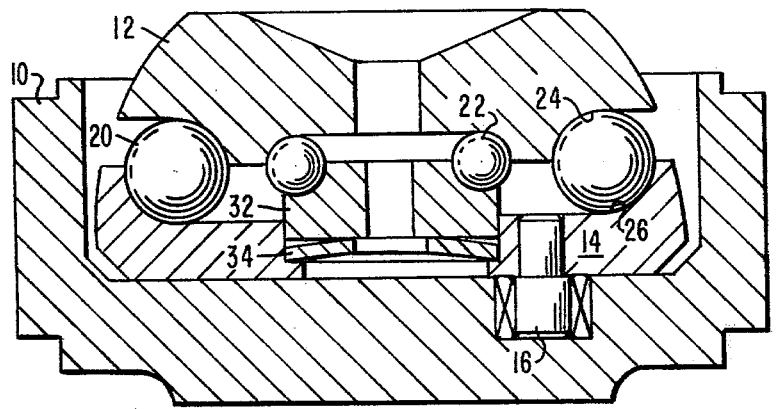
Figure 3:
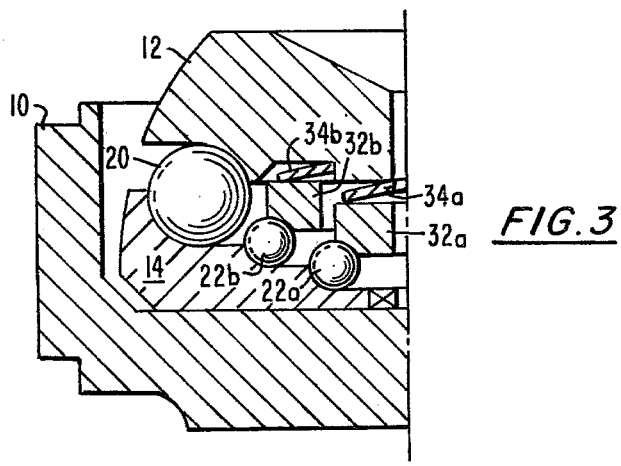
FIG. 3 shows an embodiment with three bearings.

In the arrangement shown in FIG. 1, the spring means 34 for the auxiliary bearing are arranged adjacent the roller 12. They may, however, just as well be disposed adjacent the support member as it is shown in FIG. 2 in which functionally identical members are indicated by the same numerals as used in FIG. 1. As further shown in FIG. 3, more than one, that is, as indicated two auxiliary bearings 22a and 22b may be used together with auxiliary bearing races 32a and 32b and the respective spring means 34a and 34b. The spring means 34a and 34b are so selected that each of the auxiliary bearings accepts a predetermined portion of the design load of the bearing structure.

With the arrangement described the life of the whole bearing structure is substantially increased. The load for the auxiliary bearing is so selected and the bearing is so designed that it has a life under constant load larger than the lifespan of the device with which it is used. At the same time, of course, the life of the main bearing is increased as the main bearing load is always reduced by the amount of load taken up by the auxiliary bearing or bearings. The auxiliary bearing or bearings are further arranged within the main bearing such that no additional space is required. This results in a compact bearing structure capable of handling high axial loads for a long lifetime. Also, during light loads most of the load is taken up by the smaller inner bearing and, as a result, the friction of the bearing assembly during partial load operation, is greatly reduced.

What is claimed is:

1. An axial thrust bearing assembly for supporting an axial load on a load support member, said bearing assembly comprising: a main antifriction axial support bearing disposed between said load support member and said load; an auxiliary antifriction bearing arranged between said load support member and said load and concentrically within said main bearing; and spring means disposed axially adjacent said auxiliary bearing and acting between said load support member and said load through said auxiliary bearing, said spring means being so positioned and selected such that a predetermined axial load is taken up by said auxiliary antifriction bearing while any additional load is taken up by said main bearing.

2. An axial thrust bearing assembly as recited in claim 1, wherein said spring means is a Belleville-type spring ring.

3. An axial thrust bearing assembly as recited in claim 2, wherein said spring ring is so selected that said auxiliary bearing takes up about one fourth of the load for which the bearing assembly is designed, any additional load being taken up by said main bearing.

4. An axial thrust bearing assembly as recited in claim 1, characterized by more than one auxiliary bearing, each having spring means associated therewith which spring means are so selected as to assign to each of said auxiliary bearings a predetermined share of the load.

5. An axial thrust bearing assembly as recited in claim 1, wherein said auxiliary bearing and the load carried thereby are so selected as to provide for said auxiliary bearing a normal lifespan substantially greater than the normal life of a device with which the bearing assembly is used.

* * * * *